May 27, 1924.                                         1,495,568
R. C. BENNER
SILICATED SEPARATOR AND PROCESS OF MAKING THE SAME
Filed March 28, 1923
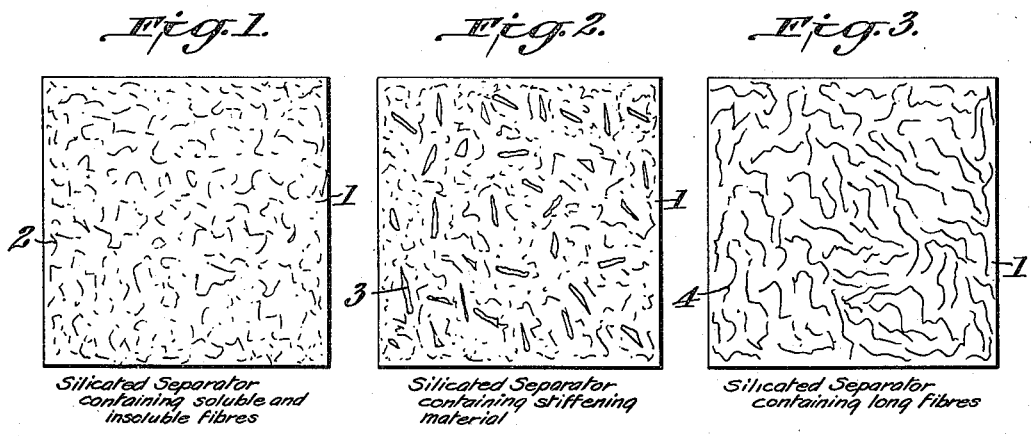
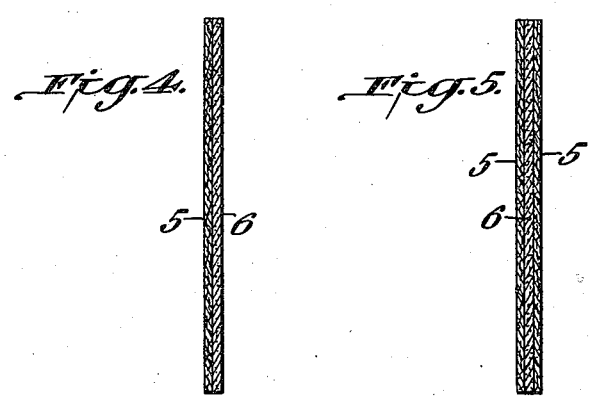
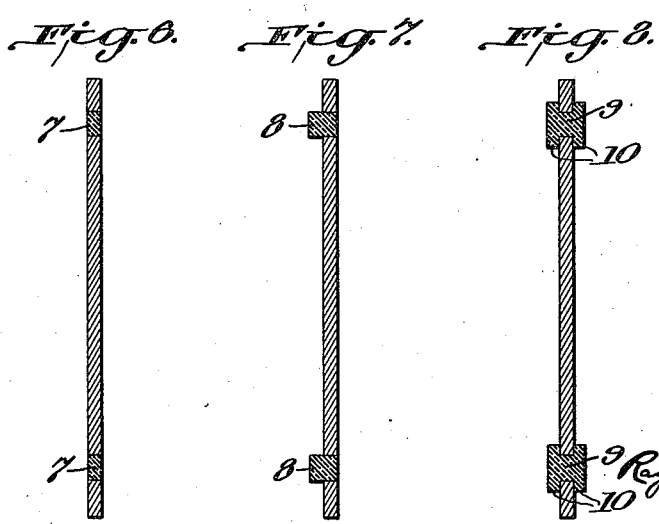

Patented May 27, 1924.

1,495,568

UNITED STATES PATENT OFFICE.

RAYMOND C. BENNER, OF BAYSIDE, NEW YORK, ASSIGNOR TO UNION CARBIDE & CARBON RESEARCH LABORATORIES, INC., A CORPORATION OF NEW YORK.

SILICATED SEPARATOR AND PROCESS OF MAKING THE SAME.

Application filed March 28, 1923. Serial No. 628,376.

*To all whom it may concern:*

Be it known that I, RAYMOND C. BENNER, a citizen of the United States, residing at Bayside, in the county of Queens and State of New York, have invented certain new and useful Improvements in Silicated Separators and Processes of Making the Same, of which the following is a specification.

This invention relates to improvements in bonded fiber separators for the electrodes of galvanic cells, particularly storage cells in which the electrolyte is a solution of sulfuric acid.

In my application Serial No. 530,943, filed January 21, 1922, of which the present is a continuation-in-part, I have described and claimed separators formed by fabricating sheets of fibrous material and impregnating the sheets with a soluble silicate. Upon immersing the impregnated separators in sulfuric acid electrolyte, gelatinous silicic acid is precipitated throughout the body of the separator. The siliceous gel may be formed by any suitable means before inserting the separator in the battery, but in such case the separator must not be allowed to dry. Silica gel is an irreversible colloid and if dehydrated by drying it will not again take up water. Silicated separators have numerous advantages, notably substantial immunity to oxidation by contact with the positive electrode. An object of the present invention is to provide means for increasing the porosity and strength of silicated fiber separators, so as to enable them to give still more effective service. An additional feature of the invention is the use, as the impregnating agent, of a silicate forming an insoluble sulfate or other insoluble compound.

Reference is to be made to the accompanying diagrammatic drawing, in which—

Fig. 1 is a front elevation of a silicated separator containing soluble and insoluble fibers;

Figs. 2 and 3 are similar views showing respectively separators containing bulky stiffening agents and long fibers;

Figs. 4 and 5 are vertical transverse sections through composite separators; and Figs. 6, 7, and 8 are similar views showing separators having wear-resistant inserts therein.

Referring to Fig. 1 of the drawings, reference numeral 1 denotes a separator sheet bonded with a silicate and in this instance containing soluble and insoluble fibers 2.

It has been found that for some purposes the presence of silicic acid may make the resistance of the separators rather too high. According to the present method this may be avoided by incorporating an electrolyte-soluble material, preferably fibrous as illustrated, with the insoluble fiber. Upon solution of this material the porosity of the separator is increased, with a corresponding decrease of resistance.

The preferred electrolyte-soluble substance is the material known as cotton linters. This dissolves with relative ease in sulfuric acid, giving the desired porosity. The channels formed by its removal are tortuous and of small diameter, however, so that no opportunity is given active material to pass through the separator.

The strength and stiffness of silicated fiber separators may be increased by adding relatively large pieces of suitable material to the fiber before working it up into sheets (Fig. 2). Sulfite screenings or other materials formed in ways which remove substances which might be harmful to the battery, are particularly suited for this purpose. Sulfite screenings are slivers of wood, indicated by numeral 3, which have been subjected to the sulfite process but have resisted conversion into pulp.

I have used with advantage screenings averaging about $\frac{1}{4}''$ to $\frac{1}{2}''$ in length and having a diameter of about $\frac{1}{32}''$ or less, but the size may vary within wide limits. The material as it comes on the market consists of a major portion of slivers associated with some fibers. It may be used in this condition for fabricating sheets to be silicated, or a further amount of fibers may be added. Separators containing screenings or the like have increased strength and retain their stiffness, after treatment with acid, somewhat better than when fibers alone are present.

As an alternative to the use of bulky stiffening materials, such as the screenings just referred to, acid-resisting fibers of considerable length may be added to increase the strength of the separator, as shown at 4, Fig. 3. In preparing separators for use in internal combustion motor starting batteries and other purposes, where strength and low resistance are required, it has been found, in some cases, that in the attempt to secure increased strength by compacting sulfite pulp fibers under heavy pressure the resistance has been unduly raised. This difficulty may be avoided by incorporating with the short pulp fibers a suitable proportion of long-fibered material, which may for example be glass wool, hair or other acid-resisting organic or inorganic fiber. The strength is increased in this manner without a proportionate increase in the resistance, since it is unnecessary to resort to compacting under heavy pressure. The long fibers are securely anchored in the binder, which is not always the case with short-fibered material.

The amount of long fibers may vary widely. Good results have been obtained with an intermixture of equal parts by weight of pulp fibers and glass wool, hair, or other acid-resistant fiber.

In some cases sheets or layers 5 of long-fibered material may be placed on one or both sides of a sulfite pulp separator 6, Figs. 4 and 5. It is preferred to make the composite separator substantially integral, as by impregnating the whole with a soluble silicate. The sheets may, however, be merely placed in contact, with or without impregnation. In my application Serial No. 593,427, filed October 9, 1922, I have described and claimed somewhat similar composite separators. The present invention is distinguished principally by the use of long fibers.

Strengthening materials of the kinds indicated in the foregoing description may be added to separators composed of sulfite pulp fibers or other inert fibers only, but they are especially advantageous in those which contain also electrolyte-soluble substances. Such substances may be fibers, volatile or soluble salts, or the like.

In Figs. 6, 7, and 8 separators having wear-resisting inserts are shown. These may be formed by perforating the separator and inserting in the perforation a sufficient amount of a plastic material to extend to or beyond the bounding planes of the separator. Fig. 6 shows wear-resistant inserts 7 flush with the surface of the sheet. Figs. 7 and 8 illustrate protruding inserts 8 and 9, the latter having heads 10. The inserts are preferably formed of plastic material, for example rubber, acid-resistant phenolic condensation products, or the like. They are secured to the body of the separator by union of the plastic material with the adjacent portion of the separator. For example, when plastic rubber is placed in the separator perforations and compressed and heated in the vulcanizing process, a portion of the rubber enters the walls of the perforations and is hardened there, forming a bond or anchorage for the insert. When headed inserts are used this bonding action is not solely depended upon to retain them, as the inserts cannot fall out even if their engagement with the separator is loosened. For this reason, and also because of the desirability of spacing the separators from the plates, the headed or protruding type of insert is preferred.

I have found that it is advantageous for some purposes to avoid the use of soluble silicates in impregnating the separators. If the precipitation of silicic acid is effected in the battery, as is most convenient, soluble salts are formed in the electrolyte, for example sodium sulfate when sodium silicate is the impregnating agent. To avoid this, a silicate which will form an insoluble sulfate may be used. Barium silicate is the preferred salt. It may be applied to the separator in any suitable way, as by admixture with the fibrous material before fabricating it into sheets, or the separator may be impregnated with a soluble silicate and then treated with a soluble barium salt. In the latter case the soluble reaction product should be washed out. When separators containing barium silicate are immersed in sulfuric acid electrolyte, silicic acid and barium sulfate are precipitated throughout the body of the separator. The presence of the insoluble sulfate does not result in objectionable increase of resistance.

The separators may be ribbed, shaped into tubular form, or given other conformations desirable for particular conditions. Various other departures from the specific forms shown may be made within the scope of the invention as defined in the appended claim.

I claim:

1. A separator comprising a fabricated sheet of fibrous materials, one of which is disintegrated by sulfuric acid electrolyte, said sheet being impregnated with a substance capable of yielding a gelatinous, acid-proof decomposition residue.

2. The invention according to claim 1, in which a strengthening material is incorporated in the separator.

3. A separator comprising short-fibered material having relatively long reinforcing bodies commingled therewith, the whole being impregnated with a substance capable of yielding a gelatinous, acid-proof decomposition residue.

4. The invention according to claim 3, in which the reinforcing bodies are enlongated wood fragments.

5. A separator comprising fibrous materials, one of which is soluble in sulfuric acid electrolyte, associated with relatively longer fibers of acid resistant material, the whole being impregnated with a substance capable of yielding a gelatinous, acid-proof decomposition residue.

6. The invention according to claim 5, in which the longer fibers comprise animal hair.

7. A composite separator comprising a sheet of relatively weak material supported by a sheet formed from long, acid-resistant fibers.

8. The invention according to claim 7, in which the separator is impregnated at least in part with a substance capable of yielding a gelatinous, acid-proof decomposition residue.

9. A composite separator comprising a sheet of sulfite pulp fiber supported by sheets formed from animal hair.

10. A separator comprising a sheet of material impregnated with a substance capable of yielding a gelatinous, acid-proof decomposition residue and of forming another insoluble compound.

11. The invention according to claim 10, in which the impregnating material is barium silicate.

12. The invention according to claim 10, in which the sheet is fabricated from fibrous material.

13. A silicated separator having a plastic wear-resisting insert secured therein.

14. A silicated separator having a plastic wear-resisting insert therein, said insert having an end overlying the surface of the separator.

15. Process of making separators comprising mixing with fibrous material a substance capable of forming an acid-proof decomposition residue, and preparing sheets from the resulting product.

In testimony whereof, I affix my signature.

RAYMOND C. BENNER.